CONVERGENCE ASSEMBLY

Filed April 1, 1969

INVENTORS
JOHN McQUEEN
LEONARD D. MINUTILLO
BY
OSTROLENK, FABER, GERB & SOFFEN
ATTORNEYS

United States Patent Office 3,544,826
Patented Dec. 1, 1970

3,544,826
CONVERGENCE ASSEMBLY
John McQueen, Bloomfield, and Leonard D. Minutillo, Sayreville, N.J., assignors to Griffiths Electronics Inc., Linden, N.J., a corporation of New Jersey
Filed Apr. 1, 1969, Ser. No. 812,131
Int. Cl. H01j *29/70*
U.S. Cl. 313—77 6 Claims

ABSTRACT OF THE DISCLOSURE

A convergence assembly for use in color television kinescopes in which the internal pole pieces are secured to the housing thereof by means of an ear or tab portion engaging a slot in the housing and by means of a substantially T shape arrangement mechanically connected to exert a force on the pole pieces tending to keep them in proper alignment position. An interleaving sheet arrangement is further provided to shield the magnetic field associated with one pole pair from the magnetic field associated with a second such pair.

This invention relates to color television picture tubes and, more particularly, to an improved convergence assembly usable therein.

Although the present invention will be described in the context of a tricolor picture tube—reproducing red, green and blue primary colors—it will be understood that the principles of the invention are equally applicable in a two-color picture tube—reproducing primary colors of organge and cyan.

In color television picture tubes of the shadow-mask variety, it is conventional practice to employ a convergence magnet assembly for the purpose of assuring that the electron beams produced by the electron guns of the tube will strike the phosphor dots of the screen in a cluster and at the same point. Thus, the electron beam emanating from one gun of a tricolor kinescope—for example, the green gun—will strike the screen in the area at which the electron beams from the red and blue guns land. The result is that a compact cluster of red, green and blue dots is lighted, to give a tiny white spot when viewed from a distance.

The convergence assembly in the tricalor kinescope employs three pairs of internal pole pieces, with each pair being associated with its own external converging magnet. In these and other color television environments, it is essential that the pole pieces be held in exact physical relationship with respect to one another to prevent any drifting apart of the electron beams which would cause misregistry. If, for example, the blue electron beam is out of alignment, the white spot would take on a yellowish tinge, with a fringe area of blue being present.

The convergence assembly typically comprises a cylinddrical housing element, with the pole pieces of each pair extending through the surface of the housing but being secured thereto by a weld or similar such mechanical connection. Thus, with six pole pieces, it will be apparent that at least six welds will be needed in order to assure proper positioning. In fact, however, twelve such welds are normally employed—two for each pole piece to further insure the exact positioning of the pole pieces and to further assure exact convergence.

The typical convergence assembly additionally includes a series of internal magnetic shields which separate the convergence assembly into three 120° portions. These shields serve to prevent the magnetic field created by, for example, the green convergence magnet from affecting the field produced by the red convergence magnet. In a typical arrangement, three isolation sheets are employed for the shields, with each being bent at a 120° angle and with the ends thereof extending through the side of the cylindrical housing element, again being secured thereto by a weld to insure exact positioning. Thus, for three such isolation sheets, a total of six additional welds would be necessitated.

As a result, it will be seen that eighteen welds or similar mechanical connections are necessary in order to fabricate this convergence assembly.

However, as will be appreciated, these welds take time in the fabrication of the convergence assembly and expend a cost which it would be desirable to reduce. Special jigs and/or fixtures would be needed in order to perform the fabrication, not only to weld the pole pieces in place but to bend and weld the isolation shields.

It is an object of the present invention, therefore, to provide an improved convergence assembly.

More particularly, it is an object of the invention to provide a convergence assembly requiring less welds in its fabrication than are required by typical prior art arrangements.

It is a further object of the present invention to provide a different isolation sheet arrangement than is provided in the prior art, to not only simplify the means of securing these sheets to the convergence assembly but, at the same time, to reduce the cost involved in the isolation sheet material.

As will become clear hereinafter, a convergence assembly constructed in accordance with the invention includes the same three pairs of internal pole pieces as are employed in prior art assemblies. However, the end of the pole piece which extends through the cylindrical housing for securement thereto is provided with an ear or tab portion which is arranged to fit into a mating slot provided in the housing itself. This serves to limit most of the movement of the internal pole piece. To further secure the pole piece to the cylindrical housing, the snubber spring usually employed in conventional convergence assemblies to fit against the inner wall of the kinescope neck is provided in a T arrangement, with the bar of the T being of a resilient material and constructed to exert a downward force on the end portions of two adjacent pole pieces. The snubber and T arrangement secure the internal pole pieces to the housing with a single weld being placed in the middle of the bar of the T arrangement to serve as the sole means for mechanically connecting the pole pieces to the convergence assembly.

Thus, it will be noted that this type of arrangement permits the previously employed twelve welds needed to secure the three magnetic pole piece pairs to the cylindrical assembly in a tricolor kinescope environment to be replaced by only three such welds.

Considering the second aspect of the invention, wherein the number of separate isolation sheets employed are to be reduced, the invention provides for the use of two such isolation sheets bent in such manner as to maintain the 120° relationship between its respective ends while, at the same time, serving to reduce the number of isolation sheets from three to two. In addition, the manner in which the isolation sheets are so bent serves in one instance to provide a fixed relationship between the isolation sheets and the convergence assembly itself. In a second manner, the end of the isolation sheets are controlled to extend through the cylindrical housing of the convergence assembly and to be bent over in a manner so as to enable a single weld to insure securement to the housing.

Thus, in this manner, not only will the number of isolation sheets be reduced, but the number of welds will be reduced from six to three.

It will therefore be seen that a convergence assembly provided in accordance with the invention will be one in which the number of welds needed to fabricate the assembly will be reduced from a total of eighteen welds to a total of six. At the same time, the number of isolation sheets will be reduced from three to two. This overall improvement represents a cost savings in manufacture of approximately 5¢ per convergence assembly. Considering the fact that the cost of an assembly itself presently runs about 30¢ to 35¢, and that present color television marketing projections call for the manufacture of some 7,000,000 or so tubes per year, the savings effected by the convergence assembly employing the principles of the present invention are extremely significant.

These and other objects of the invention will be more clearly understood from a consideration of the following description taken in accordance with the drawings in which.

Figure 1:
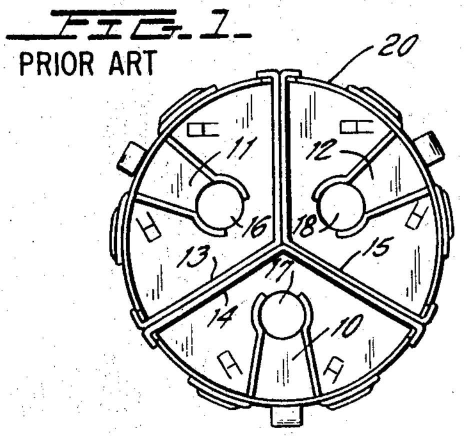
FIG. 1 PRIOR ART
FIG. 1 is a front view of a prior art convergence assembly of which the present invention represents an improvement.

Referring now to FIG. 1, the convergence assembly there shown includes a cylindrical housing 20 and employs three pairs of internal pole pieces 10, 11 and 12. In a tricolor picture tube, the pole pair 10 may be employed to converge the electron beam associated with the "green" electron gun, whereas the internal pole pairs 11 and 12 may be used to converge the beams emanating from the "red" and "blue" electron guns, respectively.

Three sets of isolation shield sheets 13, 14 and 15 are also included in the convergence assembly and are formed into a 120° angle to provide isolation between the magnetic field of one such pole pair and the magnetic field associated with a second such pole pair. (In this respect, it will be understood that surrounding the cylindrical housing are small static convergence magnets and a dynamic convergence coil which together serve to establish the magnetic fields which are used to converge the "green", "red" and "blue" electron beams to a cluster on the screen of a cathode ray tube kinescope.) It will be understood that the openings 16, 17 and 18 serve as the entry ports for the electron beams emanating from the electron gun assemblies located behind those orifices, i.e., within the plane of the paper.

Figure 2:
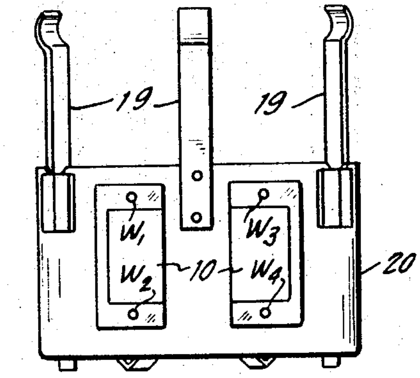
FIG. 2 PRIOR ART
FIG. 2 is a side view of the convergence assembly showing the manner in which the internal pole pieces are secured to the cylindrical unit.

FIG. 2 shows a side view of the convergence assembly of FIG. 1 in which 19 represents the snubber spring which fits within the neck of the kinescope tube to hold the convergence and electron gun assemblies in their proper positions. Also noted in FIG. 2 are the number of welds or similar such mechanical connections $W_1$–$W_4$ which serve to fix the pole piece pair 10 to the cylindrical housing 20. Four such welds are indicated in FIG. 2, and are understood to be associated only with one of the three sets of pole pieces of FIG. 1. Thus a total of twelve welds will be employed in the convergence assembly fabrication in order to secure the three sets of pole pairs 10, 11, 12 to the cylindrical unit 20.

Figure 3:
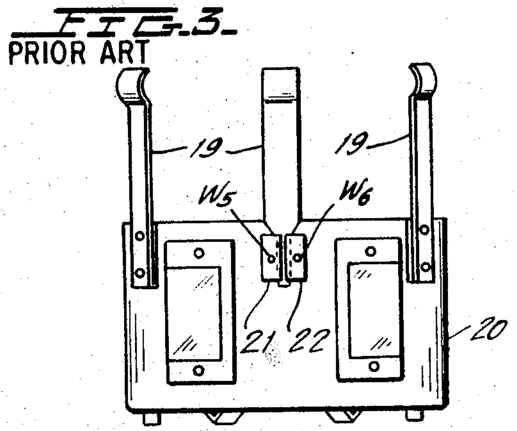
FIG. 3 PRIOR ART
FIG. 3 is an additional side view showing the manner in which the isolation sheets are secured to the cylindrical unit.

FIG. 3 shows an additional side view of the convergence assembly in which one end 21 and 22 of two respective isolation sheets 13, 14 are shown as being secured to the cylindrical housing 20 by a pair of additional welds $W_5$ and $W_6$. It will also be understood that two such similar welds are associated with the other ends of these isolation sheets 13, 14 and with the remaining isolation sheet 15 to provide a total of six additional welds for the cylindircal unit 20.

Thus, in the construction of the convergence assembly shown in FIGS. 1–3 of the drawings, a total of eighteen welds are employed and a total of three isolation sheets are required. The convergence assembly illustrated by these three drawings has had wide acceptance in the manufacture of color television kinescopes, and constitutes the prior art to the present invention.

Figure 4:
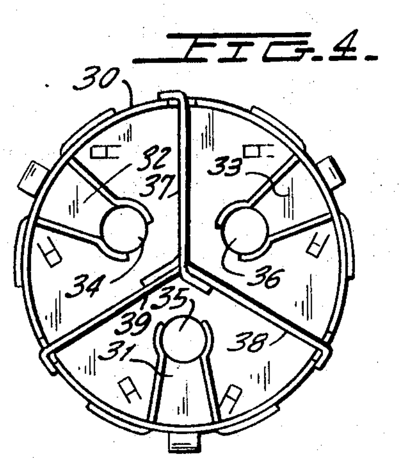
FIG. 4 is a front view of the convergence assembly constructed in accordance with the principles of the present invention.

Referring now to FIG. 4, the front view of the convergence assembly constructed in accordance with the invention there shown also includes a cylindrical housing 30 and three sets of internal pole pairs 31, 32 and 33. The openings 34, 35 and 36 for entry of the respective three electron beams are also shown. In addition, the 120° isolation sheet portions 37, 38 and 39 are shown but, as will become clear below, these three portions are formed from only two pieces of material rather than from the previously employed three pieces as in FIG. 1.

Figure 5:
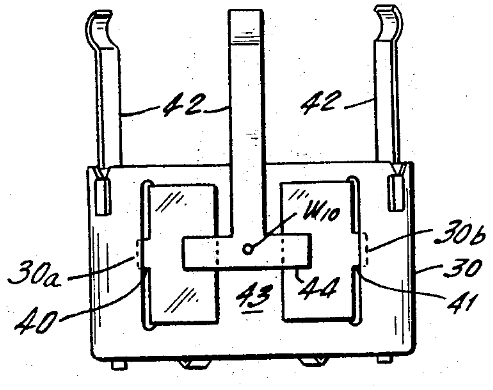
FIG. 5 is a side view of the convergence assembly showing the manner in which the internal pole pieces and the snubber unit are secured to the cylindrical housing.

Referring to FIG. 5, the manner in which the pole piece pairs are secured to the cylindrical housing 30 is shown. Each pole of a pole pair is provided with an ear or tab portion 40, 41 at the extreme end of the pole pair portion which is passed through the cylindrical housing 30. The cylindrical housing 30 is further provided with a slot 30*a*, 30*b* into which the ear 40, 41 is arranged to fit. The snubber spring 42 is further shown as being a part of a substantially T arrangement 43, with the bar of the T 44 being formed of a resilient material arranged to exert a downward pressure on the ends of the pole piece portions passing through the cylindrical housing 30. Thus, it will be appreciated that the bar 44 of the T arrangement additionally serves to maintain the magnetic pole pieces in place. In order to provide adequate securement to the cylindrical unit 20, a single weld $W_{10}$ is provided where the snubber spring 42 meets the bar 44 of the T arrangement.

(It will be noted in this respect that the bar 44 of the T arrangement serves to exert an equal force on each one of a magnetic pole pair which, together with the action of the tab 40, 41 fitting into the slot 30*a*, 30*b* of the cylindrical housing 30, serves to maintain the pole pieces in place.)

Thus, it will be seen from FIG. 5 that the number of welds required in the convergence assembly to secure the pole pieces in their proper position is reduced from a total of four per pole pair to a total of one per pole pair. The number of welds needed to secure the pole pieces to the cylindrical housing in the tricolor kinescope environment is therefore reduced from twelve to three.

Figure 6:
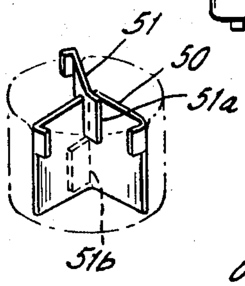
FIG. 6 is a representation of the isolation sheets employed in the convergence assembly of FIG. 4, and illustrates the manner in which the isolation sheets are formed to provide securement within the cylindrical housing.

Referring to FIG. 6, there is shown the manner in which the isolation sheets are formed to provide the necessary shielding within the convergence assembly. As contradistinct to the prior art arrangment of FIGS. 1–3, only two such sheets 50, 51 are employed instead of the previously employed three sheets 13, 14, 15. As indicated in the drawing, the center of one such sheet 50 is slotted from the top towards the bottom approximately one-half its length. The second isolation sheet 51 is shown bent at its end and slotted, with the top portion 51*a* fitting within the slot in the first isolation sheet 50 and being bent along the direction of one of the 120° legs of that sheet. The bottom portion 51*b* of the second isolation sheet 51 is similarly bent, but along the direction of the other 120° leg of the isolation sheet 50. This arrangement is such as to prevent any relative motion between the isolation sheets 50, 51, wherein it will be seen that if one such sheet has a tendency to move, it is prevented from doing so by the cooperative action of the slot in sheet 50 and by the bent portions 51*a*, 51*b* of sheet 51.

Figure 7:
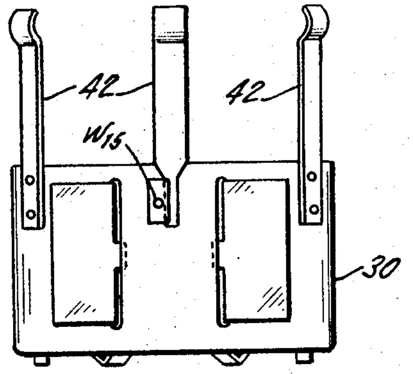
FIG. 7 is another side view of the cylindrical assembly of FIG. 4 showing the manner in which the end portions of the isolation sheets are secured to the cylindrical unit.

FIG. 7 shows the manner in which these isolation sheets 50, 51 are secured to the cylindrical housing 30. As noted, only one such weld is employed to secure the sheet to the cylindrical unit 30, as compared to the two such welds previously employed. Two such welds were employed in the prior art arrangement to secure the isolation sheets adequately to the cylindrical housing and to prevent movement between the sheets. By virtue of the present invention—wherein the isolation sheets are so slotted and bent to provide proper positioning amongst themselves—only one such weld is needed to then secure the isolation sheet to the housing. This is indicated in the drawing by the notation $W_{15}$, and it will be understood that three such welds are used in the entire arrangement to secure the isolation sheets in the manner described.

Thus, it will be seen that not only does the present convergence assembly represent a savings in the number of sheets of isolation material employed, but it also represents a savings in reducing the number of welds required in securing the isolation sheets to the assembly from six to three.

It will, therefore, be seen that a convergence assembly constructed in accordance with the invention effects a reduction of the number of welds from a total of eighteen to a total of six. At the same time, the convergence assembly represents a unit in which material cost can be reduced, with a further reduction in fabrication cost. These costs, though seeming somewhat inconsequential on a piece-by-piece basis, will be realized to be of great significance when one talks about a manufacturing of some seven million such units for inclusion in the number of tricolor kinescopes presently planned in the television industry.

The embodiments of the invention in which an exclusive privilege or property is claimed are defined as follows:

1. A convergence assembly for use in color television kinescopes of the type in which magnetic fields established between individual pairs of pole pieces precisely register a plurality of electron beams in a selected area on a phosphorescent screen, comprising:

a cylindrical housing having first and second end portions for collecting and discharging a directed electron beam, and a slotted side portion for receiving the end segments of said pole pieces;

each of said pole piece end segments including a first portion adapted for insertion through a surface of said housing and arranged to be bent thereagainst and further including a second portion at the end thereof adapted for insertion within a slot of said housing for securement thereto;

a substantially T shape arrangement including a snubber portion as the leg of the arrangement and a resilient portion as the bar of the arrangement positioned to exert a downward force on said first portion of adjacent pole pieces cooperating to produce said magnetic fields to further secure said pole pieces to said housing;

and means for mechanically connecting said T arrangement to said cylindrical housing.

2. A convergence assembly as defined in claim 1 wherein said last mentioned means mechanically connects said T arrangement to said cylindrical housing at a single point thereon.

3. A convergence assembly as defined in claim 1 wherein there is further included a plurality of isolation sheets included within said cylindrical housing and secured thereto for shielding the magnetic field associated with one of said pair of pole piece pairs from the magnetic field associated with another of said pole piece pairs.

4. A convergence assembly as defined in claim 3 and of the type intended for use in a tricolor kinescope employing three such pairs of pole pieces, wherein two isolation sheets are included and wherein one of said two sheets is slotted into two portions to receive the other of said two sheets, with the slotted portions of said one sheet being arranged on opposite sides of said other sheet to be mechanically supported therewith.

5. A convergence assembly as defined in claim 4 wherein each of said isolation sheets are bent into a substantially 120° angle, wherein the end of said one isolation sheet remote from said other sheet is mechanically connected to said cylindrical housing, and wherein the ends of said other isolation sheet are mechanically connected to said housing.

6. A convergence assembly as defined in claim 5 wherein said one end of said first sheet and said ends of said second sheet are each mechanically connected to said cylindrical housing at a single point.

References Cited

UNITED STATES PATENTS

| | | | |
|---|---|---|---|
| 3,324,328 | 6/1967 | Burdick et al. | 313—70(C)UX |
| 3,353,049 | 11/1967 | Pappadis | 313—70(C)UX |
| 3,354,338 | 11/1967 | Yorns | 313—77 |
| 3,3482,137 | 12/1969 | Johnson | 313—77X |

GEORGE HARRIS, Primary Examiner

U.S. Cl. X.R.

313—84; 335—210